US011227539B2

(12) United States Patent
Xi et al.

(10) Patent No.: US 11,227,539 B2
(45) Date of Patent: Jan. 18, 2022

(54) DISPLAY APPARATUS AND PIXEL CIRCUIT THEREOF

(71) Applicant: Au Optronics Corporation, Hsinchu (TW)

(72) Inventors: Peng-Bo Xi, Hsinchu (TW); Yan-Ru Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/092,314

(22) Filed: Nov. 8, 2020

(65) Prior Publication Data

US 2021/0390900 A1 Dec. 16, 2021

(30) Foreign Application Priority Data

Jun. 16, 2020 (TW) ................................ 109120253

(51) Int. Cl.

*G09G 3/30* (2006.01)
*G06F 3/038* (2013.01)
*G09G 5/00* (2006.01)
*G09G 3/32* (2016.01)
*G09G 3/20* (2006.01)

(52) U.S. Cl.

CPC ............. *G09G 3/32* (2013.01); *G09G 3/2092* (2013.01); *G09G 2310/0275* (2013.01)

(58) Field of Classification Search

CPC ..................... G09G 3/3233; G09G 2300/0819
See application file for complete search history.

(56) References Cited

U.S. PATENT DOCUMENTS

2012/0007848 A1* 1/2012 Han ..................... G09G 3/3233 345/212
2014/0132583 A1* 5/2014 Kim ..................... G09G 3/3233 345/212
2014/0306945 A1* 10/2014 Kishi .................. G09G 3/3233 345/211
2020/0251046 A1 8/2020 Hsieh et al.

FOREIGN PATENT DOCUMENTS

CN 108320701 7/2018
CN 110520922 11/2019

* cited by examiner

*Primary Examiner* — Nan-Ying Yang
(74) *Attorney, Agent, or Firm* — JCIPRNET

(57) ABSTRACT

A display apparatus and a pixel circuit thereof are provided. The pixel circuit is configured to drive a light-emitting diode (LED). The pixel circuit includes a driving transistor, a switch, a data writing circuit, and a voltage selector. The switch is turned on during a data-writing time period, and cut-off during a laser time period. The data writing circuit transports a data voltage to a control terminal of the driving transistor during the data-writing time period. During the data-writing time period, a second terminal of the LED receives a first reference voltage, and during the laser time period, the second terminal of the LED receives a second reference voltage. The first reference voltage and the second reference voltage are different.

11 Claims, 7 Drawing Sheets

DISPLAY APPARATUS AND PIXEL CIRCUIT THEREOF

CROSS-REFERENCE TO RELATED APPLICATION

This application claims the priority benefit of Taiwan application serial no. 109120253, filed on Jun. 16, 2020. The entirety of the above-mentioned patent application is hereby incorporated by reference herein and made a part of this specification.

BACKGROUND

Technical Field

The disclosure relates to a display apparatus and a pixel circuit thereof, and particularly to a display apparatus having an anti-short circuit function and a pixel circuit thereof.

Description of Related Art

With the progress made with the process of light-emitting diodes, it has become a mainstream to use micro-light-emitting diodes to produce high-resolution display apparatus. As the number of the light-emitting diodes disposed on the display apparatus has been increasing, when part of the light-emitting diodes are damaged, the display quality may also be damaged. And when a small number of light-emitting diodes are damaged, not only is it difficult but it also takes a certain amount of time to perform maintenance on the display apparatus. More importantly, when a damaged light-emitting diode is driven, a short circuit may occur on the light-emitting diode. In addition to causing unnecessary power consumption, this could also lead a high current to flow through a certain part of the circuit.

SUMMARY

Accordingly, the disclosure provides a display apparatus and a pixel circuit thereof, which effectively stop the laser operation of the damaged light-emitting diode and prevent the occurrence of a short circuit.

The pixel circuit of the present disclosure is configured to drive a light-emitting diode. The pixel circuit includes a driving transistor, a switch, and a data writing circuit. The driving transistor has a first terminal coupled to a first terminal of the light-emitting diode. The switch is coupled between the first terminal and a control terminal of the driving transistor, and the switch is turned on during the data-writing time period and cut off during the laser time period. The data writing circuit transmits data voltage to a control terminal of the driving transistor during the data-writing time period. During the data-writing time period, a second terminal of the light-emitting diode receives a first reference voltage. And during the laser time period, the second terminal of the light-emitting diode receives a second reference voltage. The first reference voltage and the second reference voltage are not the same.

The display apparatus of the present disclosure includes multiple pixel circuits and at least one voltage selector. The pixel circuits are configured to drive multiple light-emitting diodes respectively. Each of the pixel circuits includes a driving transistor, a switch, and a data writing circuit. The driving transistor has a first terminal coupled to a first terminal of the corresponding light-emitting diode. The switch is coupled between the first terminal and a control terminal of the driving transistor, and the switch is turned on during the data-writing time period and cut off during the laser time period. The data writing circuit transmits a data voltage to a control terminal of the driving transistor during the data-writing time period. The voltage selector transmits the first reference voltage to a second terminal of the first light-emitting diode during the data-writing time period, and transmits the second reference voltage to the second terminal of the first light-emitting diode during the laser time period. And the first reference voltage and the second reference voltage in the above description are different from each other.

Based on the above, the pixel circuit of the embodiment of the present disclosure has the driving transistor coupled to the first terminal of the light-emitting diode during the data writing time interval through the switch, causing a short circuit with the control terminal of the driving transistor, and the second terminal of the light-emitting diode receives the first reference voltage. When the light-emitting diode is damaged, the first reference voltage may be transmitted to the control terminal of the driving transistor through the switch. Therefore, during the laser time period, when the light-emitting diode is damaged, the driving transistor may be cut off based on the first reference voltage to prevent the light-emitting diode from short-circuiting.

DESCRIPTION OF THE EMBODIMENTS

Figure 1:
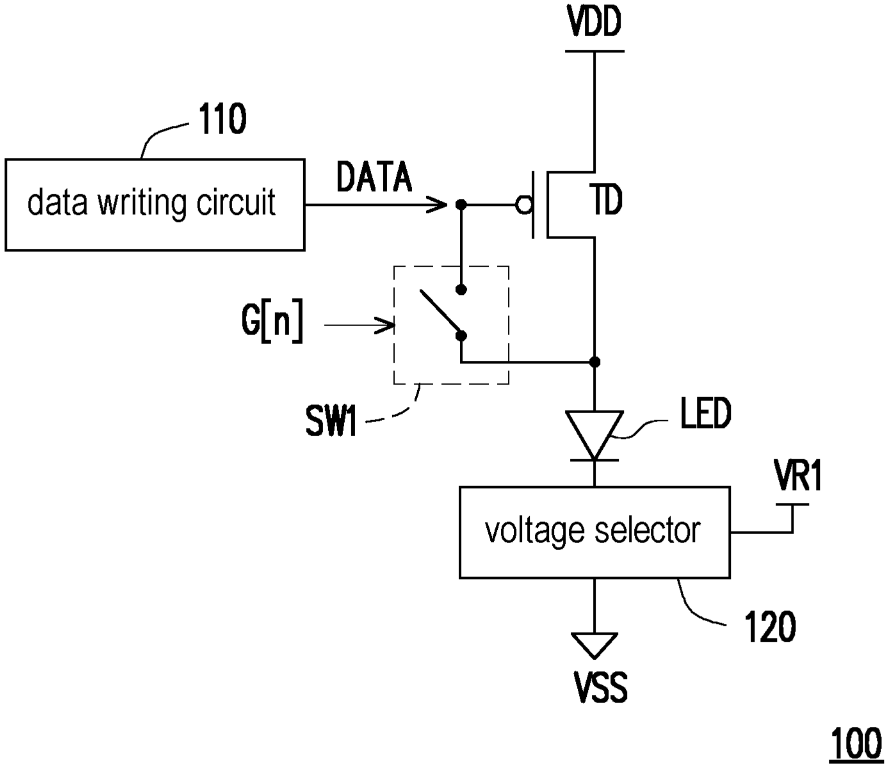
FIG. 1 is a schematic view of a pixel circuit according to an embodiment of the present disclosure.

FIG. 1 is a schematic view of a pixel circuit according to an embodiment of the present disclosure. A pixel circuit 100 includes a driving transistor TD, a switch SW1, a data writing circuit 110, and a voltage selector 120. The pixel circuit 100 is configured to drive a light-emitting diode LED, and the light-emitting diode LED may be a micro LED or an LED in any other form. A first terminal of the driving transistor TD is coupled to a first terminal of the light-emitting diode LED. A second terminal of the driving transistor TD receives a supply voltage VDD. A control terminal of the driving transistor TD is coupled to the data writing circuit 110 and the switch SW1. The switch SW1 bridges across the control terminal of the driving transistor TD and the first terminal of the light-emitting diode LED. The switch SW1 is controlled by a scanning signal G[n] to be turned on or cut off. On the other hand, a second terminal of the light-emitting diode LED is coupled to the voltage selector 120. The voltage selector 120 receives a reference voltage VR1 and a reference voltage VSS, and selects one of the reference voltage VR1 and the reference voltage VSS to be transmitted to the second terminal of the light-emitting diode LED. In the present embodiment, the first terminal of the light-emitting diode LED is its anode terminal, and the second terminal of the light-emitting diode LED is its cathode terminal.

In the present embodiment, the voltage selector 120 may be provided in the pixel circuit 100; or, in other embodiments, the voltage selector 120 may also be provided outside the pixel circuit 100. When the voltage selector 120 is provided outside the pixel circuit 100, multiple pixel circuits that may enter the data-writing time period and the laser time period at the same time may share the same voltage selector 120.

Regarding the operational details, during the data-writing time period, the data writing circuit 110 may write a data voltage DATA into the control terminal of the driving transistor TD. During the data-writing time period, the switch SW1 is turned on based on the scanning signal G[n]. Please note here that if the light-emitting diode LED is in a normal and undamaged condition, the data voltage DATA may be transmitted to the first terminal of the light-emitting diode LED through the switch SW1. Correspondingly, also during the data-writing time period, the voltage selector 120 selects the reference voltage VR1 having a relatively high voltage value to provide the same to the second terminal of the light-emitting diode LED. At this time, the light-emitting diode LED does not emit light.

Then, during the laser time period which is after the data-writing time period, the switch SW1 is cut off based on the scanning signal G[n]. At this time, the voltage selector 120 changes to provide the reference voltage VSS to the second terminal of the light-emitting diode LED. The reference voltage VSS may have a relatively low voltage value (comparing with the first reference voltage VR1), and the reference voltage VSS may be a ground voltage. Meanwhile, the driving transistor TD provides a driving current based on the data voltage DATA to drive the light-emitting diode LED, such that the light-emitting diode LED may emit light successfully.

Incidentally, in the present embodiment, the driving transistor TD is a P-type transistor. In addition, in the embodiment of the present disclosure, the terminal opposite to the driven terminal of the light-emitting diode LED may receive a variable voltage. And when the driving transistor TD is a P-type transistor, the driven terminal of the light-emitting diode LED is the anode terminal, and the terminal opposite to the driven terminal of the light-emitting diode LED is the cathode terminal. Furthermore, the terminal opposite to the driven terminal of the light-emitting diode LED may also receive a variable voltage. In other words, the voltage selector 120 provides selectively the reference voltage VR1 or the reference voltage VSS to the cathode terminal of the light-emitting diode LED.

Figure 2A:
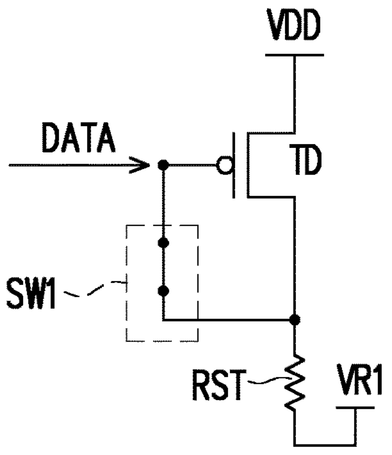
FIG. 2A to FIG. 2C are operational diagrams of a pixel circuit when a light-emitting diode is damaged according to an embodiment of the present disclosure.
Figure 2B:
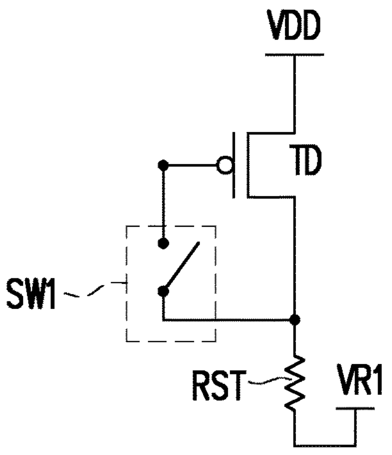
Figure 2C:
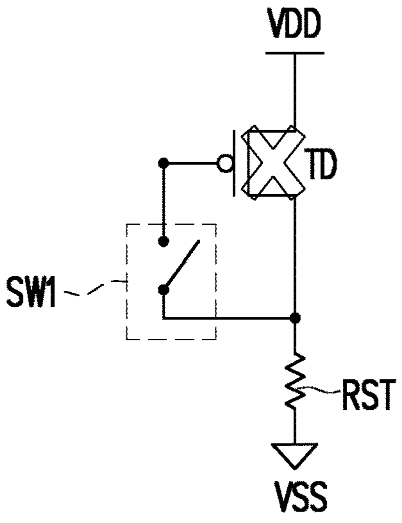

On the other hand, if the light-emitting diode LED is damaged, please refer to FIG. 1 and FIG. 2A to FIG. 2C at the same time. FIG. 2A to FIG. 2C show the operational diagrams of a pixel circuit when a light-emitting diode is damaged according to an embodiment of the present disclosure. In FIG. 2A, based on the condition that the light-emitting diode LED is damaged, the light-emitting diode LED may be equivalent to a resistor RST.

During the data-writing time period, the switch SW1 is turned on, and the data voltage DATA is provided to be written into the control terminal of the driving transistor TD. Furthermore, the voltage selector 120 provides the reference voltage VR1 to the second terminal of the equivalent resistor RST. At this time, the resistance value based on the resistor RST is much lower than the output impedance of the data writing circuit 110. Therefore, the resistor RST forms a pull-up resistance with a strong drive capability, pulling up the voltage value of the control terminal of the driving transistor TD to a voltage value close to (or equal to) the reference voltage VR1.

Then, in FIG. 2B, when the data-writing time period ends, the switch SW1 is cut off, and the voltage value of the control terminal of the driving transistor TD is maintained at a voltage value close to (or equal to) the reference voltage VR1. And in FIG. 2C, when entering the laser time period, the voltage selector 120 changes to provide the reference voltage VSS which has a relatively low voltage value to the second terminal of the resistor RST. However, based on the fact that the control terminal of the driving transistor TD has a relatively high voltage value, the driving transistor TD is cut off effectively. Therefore, as the current path between the power supply voltage VDD and the light-emitting diode LED is cut off, the short circuit may be prevented effectively.

Figure 3:
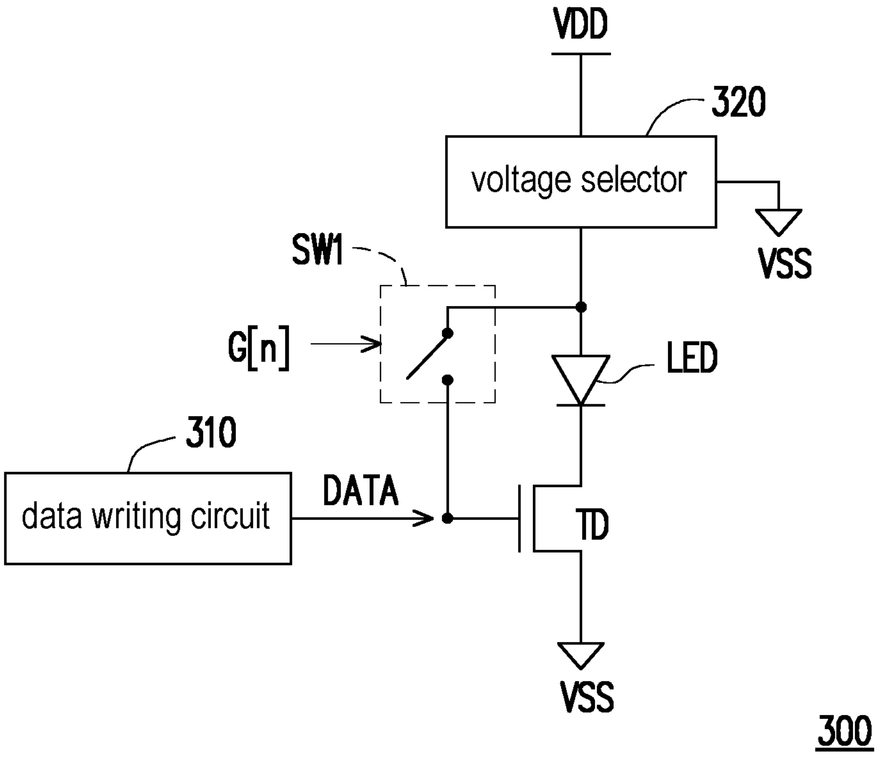
FIG. 3 is a schematic view of a pixel circuit according to another embodiment of the present disclosure.

FIG. 3 is a schematic view of a pixel circuit according to another embodiment of the present disclosure. A pixel circuit 300 includes a driving transistor TD, a switch SW1, a data writing circuit 310, and a voltage selector 320. Its differences between the embodiment in FIG. 1 are that the driving transistor TD in the present embodiment is an N-type transistor, the voltage selector 320 is coupled to the anode terminal of a light-emitting diode LED, the driving transistor TD is coupled to the cathode terminal of the light-emitting diode LED, and that the driving transistor TD is coupled between the cathode terminal of the light-emitting diode LED and a reference voltage VSS.

The pixel circuit 300 and the pixel circuit 100 are complementary embodiments which share the similar operational details, which are not repeated hereunder. Note that the voltage selector 320 provides the reference voltage VSS to the anode terminal of the light-emitting diode LED during the data-writing time period, adopts a supply voltage VDD as the reference voltage during the laser time period, and provides the supply voltage VDD to the anode terminal of the light-emitting diode LED.

Figure 4:
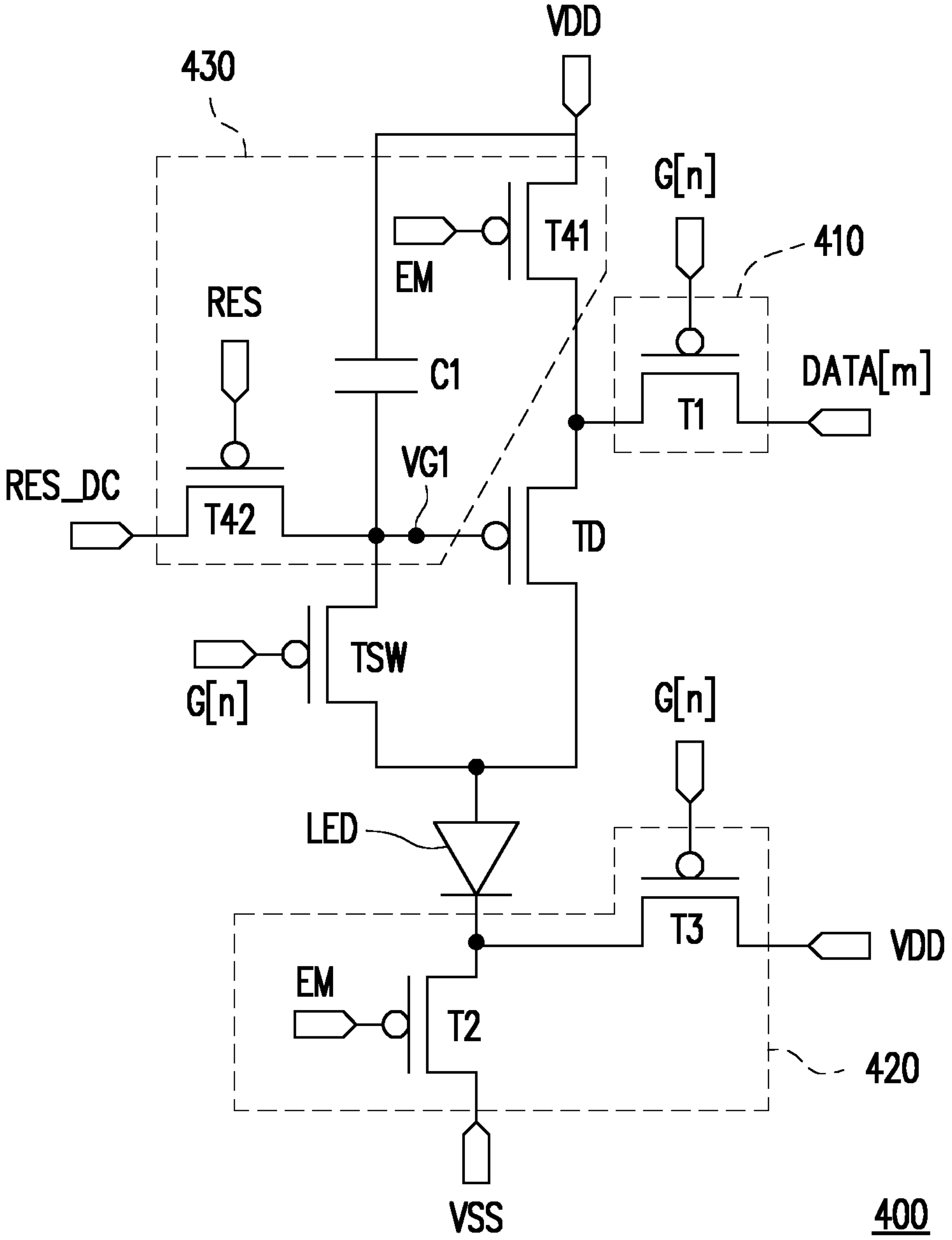
FIG. 4 is a schematic view of a pixel circuit according to another embodiment of the present disclosure.

FIG. 4 is a schematic view of a pixel circuit according to another embodiment of the present disclosure. A pixel circuit 400 includes a driving transistor TD, a switch constructed by a transistor TSW, a data writing circuit 410, a voltage selector 420, and an auxiliary circuit 430. The data writing circuit 410 includes a transistor T1. One terminal of the transistor T1 receives a data voltage DATA[m], the other terminal of the transistor T1 is coupled to the driving transistor TD, and a control terminal of the transistor T1 receives a scanning signal G[n]. The voltage selector 420 includes a transistor T2 and a transistor T3. The transistor T2 is coupled to the cathode terminal of a light-emitting diode LED, and the transistor T2 receives a reference voltage VSS. The transistor T2 is controlled by a laser control signal EM to be turned on or cut off. The transistor T3 is also coupled to the cathode terminal of the light-emitting diode LED, and the transistor T3 receives the supply voltage VDD. The transistor T3 is controlled by the scanning signal G[n] to be turned on or cut off. The transistor TSW is coupled between the anode terminal of the light-emitting diode LED and the control terminal of the driving transistor TD, and the transistor TSW is controlled by the scanning signal G[n] to be turned on or cut off.

In the present embodiment, the driving transistor TD is an N-type transistor, and the driven terminal of the light-emitting diode LED is the cathode terminal. In the light-emitting diode LED, the terminal opposite to the driven terminal is the anode terminal. Here, the voltage selector 420 may selectively provide the reference voltage VDD or the reference voltage VSS to the anode terminal of the light-emitting diode LED.

In the present embodiment, during the data-writing time period, the transistors T1, T3, and TSW may be turned on based on the scanning signal G[n], and the transistor T2 is cut off. The data voltage DATA[m] is written into the control terminal of the driving transistor TD through the transistor T1, the driving transistor TD, and the transistor TSW which are turned on. In addition, the supply voltage VDD as the reference voltage may be transmitted to the cathode terminal of the light-emitting diode LED through the turned on transistor T3. During the laser time period, the transistor T2 is turned on based on a laser control signal EM, and the transistors T1 and T3 are cut off. The reference voltage VSS may be transmitted to the cathode terminal of the light-emitting diode LED through the turned on transistor T2.

Furthermore, the auxiliary circuit 430 is coupled to the path on which the driving transistor TD receives the supply voltage VDD. The auxiliary circuit 430 includes a transistor T41, a transistor T42, and a capacitor C1. One terminal of the transistor T41 receives the supply voltage VDD. The other terminal of the transistor T41 is coupled to the coupling endpoint of the driving transistor TD and the transistor T1. And the control terminal of the transistor T41 receives the laser control signal EM. One terminal of the transistor T42 receives a reset voltage RES_DC. The other terminal of the transistor T42 is coupled to the control terminal of the driving transistor TD. And the control terminal of the transistor T42 receives a reset control signal RES. Also, the capacitor C1 is turned on in series between the supply voltage VDD and the control terminal of the driving transistor TD.

Here, the transistor T41 may be configured to control the laser brightness of the light-emitting diode LED. Simply put, when the laser signal EM is a pulse width modulation signal, the transistor T41 may adjust the laser brightness of the light-emitting diode LED based on the duty cycle of the laser signal EM. Furthermore, when the transistor T42 is turned on, a voltage VG1 of the control terminal of the driving transistor TD may be reset based on the reset voltage RES_DC.

In the present embodiment, the transistors T1 to T3, T41, T42, and TSW are all P-type transistors.

Figure 5:
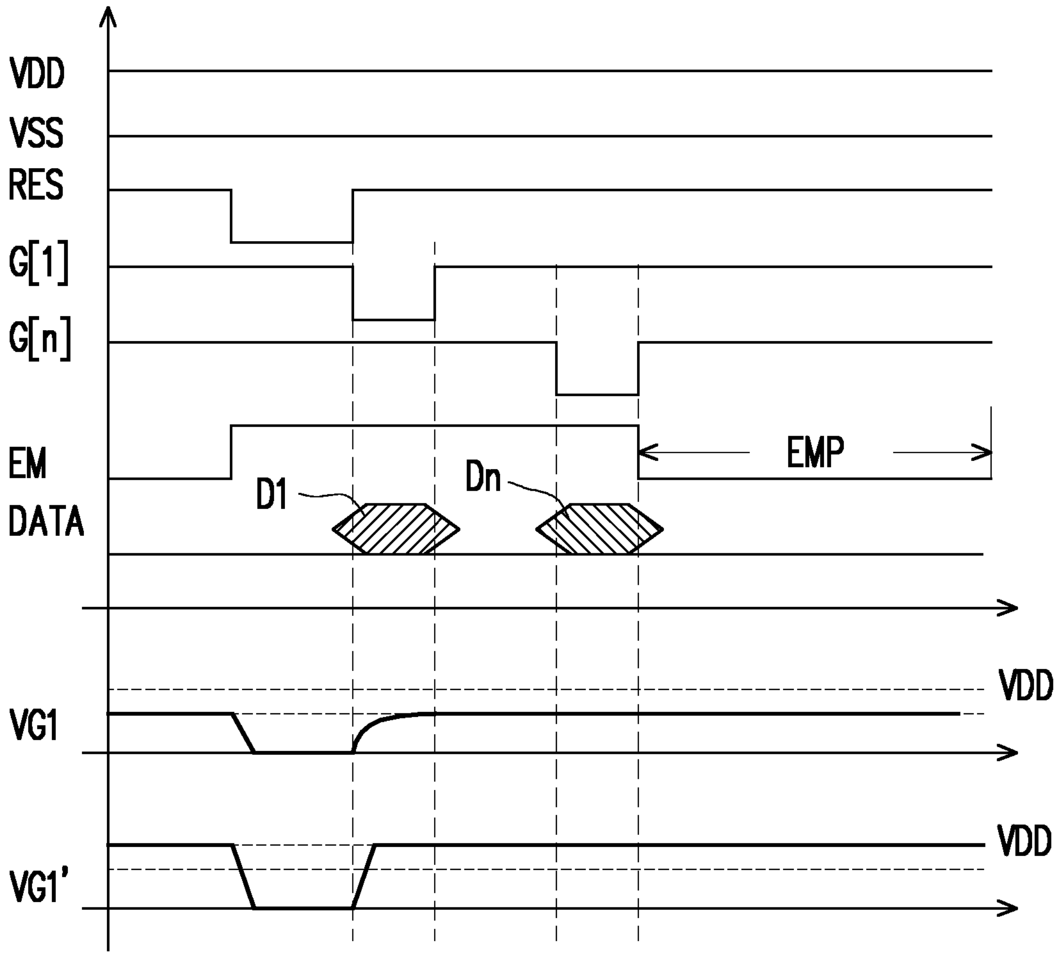
FIG. 5 is an operational waveform of a pixel circuit according to an embodiment of the present disclosure.

Please refer to FIG. 4 and FIG. 5 at the same time. FIG. 5 is an operational waveform of a pixel circuit according to an embodiment of the present disclosure. When the number of the pixel circuits is n, the n pixel circuits enter the data-writing time period based on scanning signals G[1] to G[n]. When the scanning signal G[1] is enabled (the voltage level is pulled low), the pixel circuit corresponding to the scanning signal G[1] is written into data D1. And when the scanning signal G[n] is enabled (the voltage level is pulled low), the pixel circuit corresponding to the scanning signal G[n] is written into data Dn.

Take the pixel circuit corresponding to the scanning signal G[1] as an example. If the light-emitting diode is in a normal condition, the voltage VG1 of the control terminal of the driving transistor may be written as a voltage value lower than that of the supply voltage VDD. But if the light-emitting diode is damaged, a voltage VG1' of the control terminal of the driving transistor is pulled up to a voltage value substantially equal to that of the supply voltage VDD. Therefore, during a laser time period EMP (the voltage value of the laser control signal EM is pulled down), the driving transistor may be cut off or generate a driving current based on the voltage VG1 or the voltage VG1' of its control terminal. In other words, the pixel circuit of the embodiment of the present disclosure may automatically cut off the driving transistor when the light-emitting diode is damaged, so as to prevent the occurrence of a short circuit.

Incidentally, in the present embodiment, the pixel circuits corresponding to the scanning signals G[1] to G[n] may perform lasers simultaneously during the same laser time period EMP.

Figure 6:
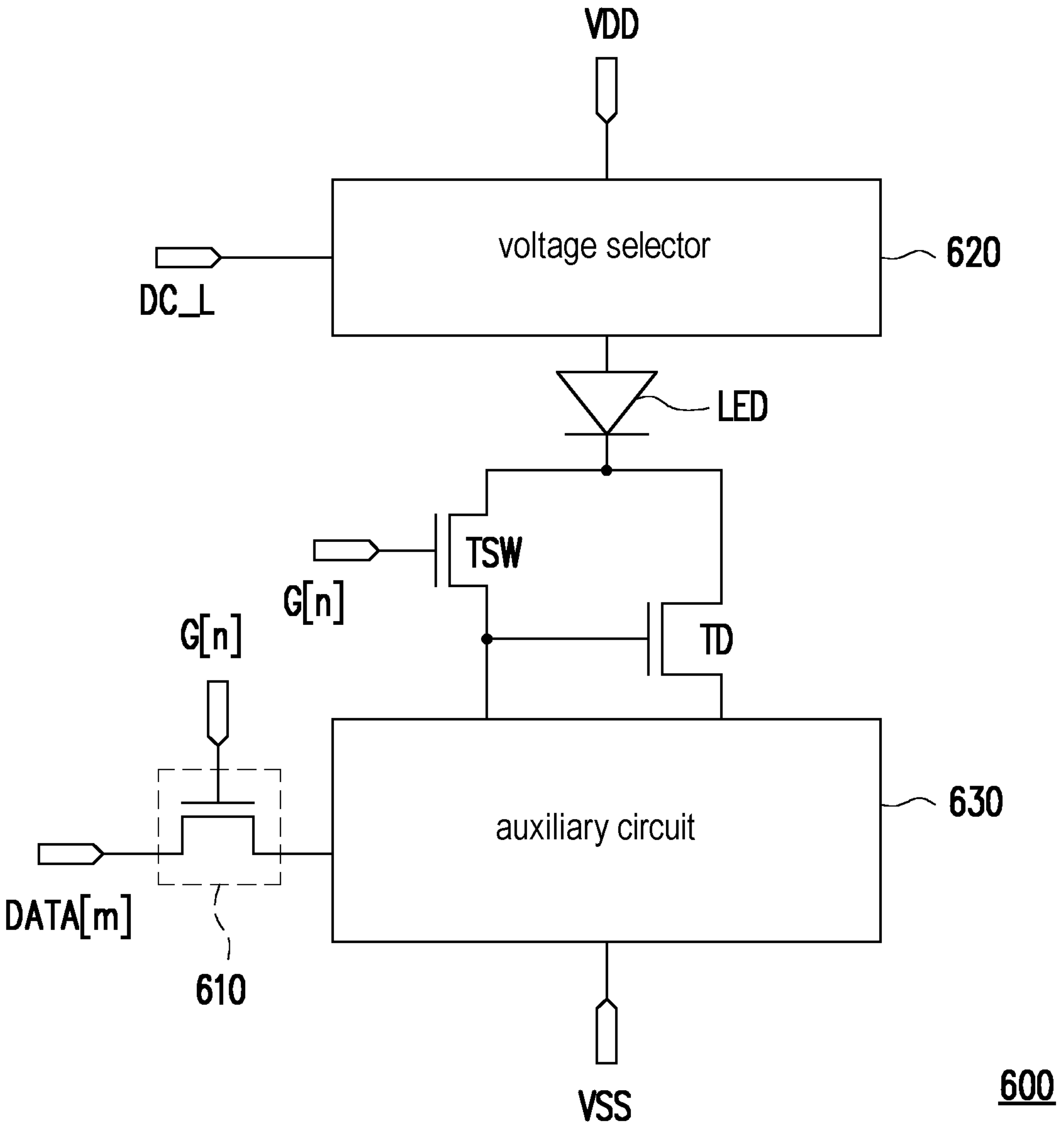
FIG. 6 is a schematic view of a pixel circuit according to another embodiment of the present disclosure.

FIG. 6 is a schematic view of a pixel circuit according to another embodiment of the present disclosure. A pixel circuit 600 is an embodiment of a circuit complementary to the pixel circuit 500. The pixel circuit 600 includes a transistor TSW, a driving transistor TD, a data writing circuit 610, a voltage selector 620, and an auxiliary circuit 630. The voltage selector 620 is coupled between a supply voltage VDD and the anode terminal of a light-emitting diode LED, and the auxiliary circuit 630 is coupled to the path on which the driving transistor TD receives a reference voltage VSS. The voltage selector 620 may select the supply voltage VDD or a reference voltage DC_L during different time periods to provide the same to the anode terminal of the light-emitting diode LED. And the reference voltage DC_L is lower than the supply voltage VDD, and the voltage values of the reference voltage DC_L and the reference voltage VSS may be the same with or different from each other.

In the present embodiment, the transistor TSW, the driving transistor TD, and the transistor constructing the data writing circuit 610 may all be N-type transistors.

Figure 7:
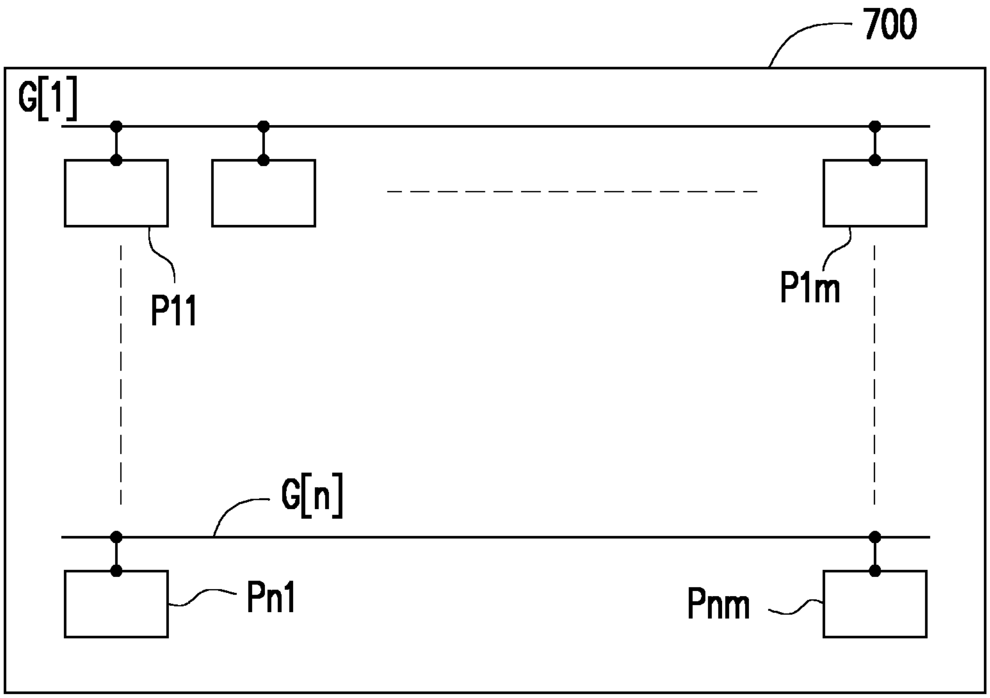
FIG. 7 is a schematic view of a display apparatus according to an embodiment of the present disclosure.

FIG. 7 is a schematic view of a display apparatus according to an embodiment of the present disclosure. A display apparatus 700 includes multiple pixel circuits P11 to Pnm. In the present embodiment, the pixel circuits P11 to Pnm may be divided into multiple pixel rows, and receive scanning signals G[1] to G[n] respectively. The pixel circuits P11 to Pnm may be implemented based on the pixel circuits of the foregoing embodiments. In addition, the pixel circuits P11 to Pnm may receive the same laser control signal to perform a simultaneous laser operation. Alternatively, the pixel circuits P11 to Pnm may be divided into multiple partitions based on the corresponding scanning signals G[1] to G[n], and these partitions may respectively receive multiple laser control signals that are enabled sequentially to perform a progressive laser operation.

Of course, it is not necessarily for the method of partitioning the pixel circuits P11 to Pnm to be carried out based on the scanning signals G[1] to G[n], as the above description is only an example which does not limit the scope of implementation of the present disclosure.

In summary, the pixel circuit of the present disclosure adopts the voltage selector and the switch to set the voltage of the control terminal of the driving transistor during the data-writing time period based on the condition of the light-emitting diode. With such configuration, when the light-emitting diode is damaged, the driving transistor may be cut off during the laser time period to prevent a short circuit.

What is claimed is:

1. A pixel circuit, configured to drive a light-emitting diode, the pixel circuit comprising:

a driving transistor, comprising a first terminal coupled to a first terminal of the light-emitting diode;

a switch, coupled between the first terminal and a control terminal of the driving transistor, turned on during a data-writing time period and cut off during a laser time period;

a data writing circuit, transmitting a data voltage to the control terminal of the driving transistor during the data-writing time period, wherein during the data-writing time period, a second terminal of the light-emitting diode receives a first reference voltage, and during the laser time period, the second terminal of the light-emitting diode receives a second reference voltage, wherein the first reference voltage and the second reference voltage are not the same; and a voltage selector, transmitting the first reference voltage to the second terminal of the light-emitting diode during the data-writing time period, and transmitting the second reference voltage to the second terminal of the light-emitting diode during the laser time period, wherein the voltage selector comprises:

a first transistor, comprising a first terminal coupled to the second terminal of the light-emitting diode, a control terminal receiving a scanning signal, and a second terminal receiving the first reference voltage; and a second transistor, comprising a first terminal coupled to the second terminal of the light-emitting diode, a control terminal receiving a laser control signal, and a second terminal receiving the second reference voltage.

2. The pixel circuit according to claim 1, wherein when the first terminal of the light-emitting diode is an anode terminal and the second terminal of the light-emitting diode is a cathode terminal, the first reference voltage is higher than the second reference voltage.

3. The pixel circuit according to claim 1, wherein when the first terminal of the light-emitting diode is a cathode terminal and the second terminal of the light-emitting diode is an anode terminal, the first reference voltage is lower than the second reference voltage.

4. The pixel circuit according to claim 1, wherein the data writing circuit comprises:

a transistor, comprising a first terminal for receiving the data voltage, a second terminal coupled to a second terminal of the driving transistor, and a control terminal receiving a scanning signal.

5. The pixel circuit according to claim 1, further comprising:

an auxiliary circuit, coupled between a second terminal of the driving transistor and the first reference voltage, receiving a laser control signal, and controlling a time period for transmitting the first reference voltage to the second terminal of the driving transistor based on the laser control signal.

6. The pixel circuit according to claim 5, wherein the auxiliary circuit is further coupled to the control terminal of the driving transistor, and the auxiliary circuit receives a reset control signal and transmits a reset voltage to the control terminal of the driving transistor based on the reset control signal.

7. The pixel circuit according to claim 6, wherein the auxiliary circuit comprises:

a first transistor, comprising a first terminal receiving the first reference voltage, a second terminal coupled to the second terminal of the driving transistor, and a control terminal receiving the laser control signal; and a second transistor, comprising a first terminal receiving the reset voltage, a second terminal coupled to the control terminal of the driving transistor, and a control terminal receiving the reset control signal.

8. A display apparatus, comprising:

a plurality of pixel circuits, configured to drive a plurality of light-emitting diodes respectively, wherein each of the pixel circuits comprises:

a driving transistor, comprising a first terminal coupled to a first terminal of a corresponding first light-emitting diode;

a switch, coupled between the first terminal and a control terminal of the driving transistor, turned on during a data-writing time period and cut off during a laser time period;

a data writing circuit, transmitting a data voltage to the control terminal of the driving transistor during the data-writing time period;

at least one voltage selector, transmitting a first reference voltage to a second terminal of the first light-emitting diode during the data-writing time period, and transmitting a second reference voltage to the second terminal of the first light-emitting diode during the laser time period, wherein the first reference voltage and the second reference voltage are not the same; and a voltage selector, transmitting the first reference voltage to the second terminal of the light-emitting diode during the data-writing time period, and transmitting the second reference voltage to the second terminal of the light-emitting diode during the laser time period, wherein the voltage selector comprises:

a first transistor, comprising a first terminal coupled to the second terminal of the light-emitting diode, a control terminal receiving a scanning signal, and a second terminal receiving the first reference voltage; and a second transistor, comprising a first terminal coupled to the second terminal of the light-emitting diode, a control terminal receiving a laser control signal, and a second terminal receiving the second reference voltage.

9. The display apparatus according to claim 8, wherein when a first terminal of the first light-emitting diode is an anode terminal and the second terminal of the first light-emitting diode is a cathode terminal, the first reference voltage is higher than the second reference voltage, and when the first terminal of the first light-emitting diode is a cathode terminal and the second terminal of the first light-emitting diode is an anode terminal, the first reference voltage is lower than the second reference voltage.

10. The display apparatus according to claim 8, wherein some of the pixel circuits are divided into a plurality of partitions, and the partitions perform a progressive laser operation.

11. The electronic apparatus according to claim 8, wherein some of the light-emitting diodes emit laser simultaneously.

* * * * *